Sept. 14, 1948.   N. A. JONES   2,449,121
COUPLING NUT
Filed Aug. 26, 1946   2 Sheets-Sheet 1

Inventor
Nelson A. Jones

Sept. 14, 1948.　　　N. A. JONES　　　2,449,121
COUPLING NUT

Filed Aug. 26, 1946　　　2 Sheets-Sheet 2

Inventor
Nelson A. Jones
By Moore, Fenwick & Lawrence
Attorneys

Patented Sept. 14, 1948

2,449,121

UNITED STATES PATENT OFFICE 2,449,121

COUPLING NUT

Nelson A. Jones, Catawissa, Pa.

Application August 26, 1946, Serial No. 692,996

2 Claims. (Cl. 285—177)

This invention relates to a coupling device, and more particularly to a device adapted for coupling the ends of a hose or conduit. It is equally adaptable to flexible rubber hose or metallic conduit or pipe. It will be readily apparent that the device is also adaptable to retain a closure member on the end of a pipe, spout or faucet.

Devices of the general type disclosed herein are already known in the prior art. However, there are certain disadvantages of the prior devices which it is desired to overcome by this invention. In the prior devices it has not been uncommon to use interconnecting parts which have tongues or lugs which are movable into interlocking engagement by relative rotational movement. In most of these devices the lugs on at least one of the parts are provided with inclined cam surfaces whereby the relative rotational movement draws the two parts together.

While this type of general arrangement was easy to couple and uncouple, it had a serious drawback in that when the device was subjected to jarring or vibration, the creeping relative rotational movement of the parts caused the coupling to be disconnected.

This was caused partly by reason of the fact that the locking cam surfaces of the lugs were in a plane inclined with respect to the axis of the coupling device so that the least relative rotational movement between the parts permitted the latter to separate slightly. This in turn reduced the pressure and the friction between the cam surfaces with the result that the resistance to relative rotational movement was further reduced and consequently the two parts become unlocked by jarring and vibration. The present invention overcomes the above disadvantages by making the coupling means separate from the means for drawing together the two elements which are held in fluid-tight engagement so that relative rotational movement between the interlocking lugs on the coupling device will not affect the pressure between the coupled elements. The invention provides a two-part coupling ring wherein one part has a swivel connection with one of the elements to be coupled and the other part is threadedly engaged with the other element. The two parts of the coupling ring have circumferentially interlocking lugs which permit the parts to be quickly uncoupled. The interlocking lugs on the coupling ring parts and the threaded connection between the one part and one of the elements to be coupled are effectively in mechanical series so that the coupling may be rotated in one direction to lock the two parts together and continued rotation will draw together the two elements to be coupled. Then by rotating the coupling device in the opposite direction the interlocking lugs are quickly disengaged and the two elements are quickly uncoupled.

The general object of the invention is to overcome the disadvantages of the prior devices, and to provide an improved coupling device of simple and economical construction, and one which will be easier to manipulate than the couplings heretofore known.

A further object of the invention is to provide a coupling device which can be quickly connected and drawn into tight sealing engagement and yet can be very quickly disconnected.

Another object is to provide an improved coupling device in which a two-part coupling ring is provided for connecting together the two elements of the coupling, and in which one part of the coupling ring has screw-threaded engagement with one of the elements for exerting pressure on the sealing surfaces, the other part of the ring being rotatably engaged with the other element, both parts of the coupling ring being provided with circumferentially extending lugs having interlocking surfaces which are in planes at right angles to the axis of the coupling device, and which can be disengaged by relative rotational movement of the coupling ring for quickly disconnecting the two elements of the coupling.

A further object is to provide a coupling of the type described which can be economically manufactured.

A further object is to provide an improved coupling device which may be fabricated from bar steel, forged cast steel, cast iron, or from plastic materials.

Other and further objects of the invention will be readily apparent, and the advantages thereof will be understood from the following description when considered in connection with the accompanying drawings, which illustrate a preferred embodiment of the invention, and in which.

Figure 1:
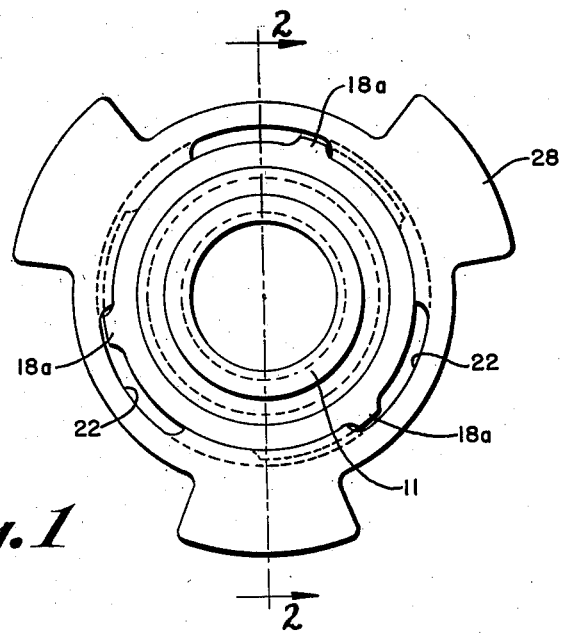
Figure 1 is an elevational view of a coupling device made in accordance with the present invention.

In the illustrated embodiment of the present invention, the coupling device is disclosed as comprising two nipples 10, 11, which are adapted to be attached to the two ends of a hose or conduit to be coupled. As shown in the drawings, they are adapted to threadedly engage conduits such as pipes, but it will be obvious that they may be secured thereto in any other desired and suitable manner. A two-part coupling ring 12 comprising an outer body portion 13, and an inner adapter 14, serve as the means for drawing the two nipples together and holding them in fluid-tight engagement. The nipple 10 has an annular flange 16 provided with a radial surface which is engaged by an annular radial surface of a collar 17 on the outer body portion 13, thereby providing a swivel connection between the latter and the nipple 10. The nipple 11 is provided with external threads which are adapted to engage internal threads on the adapter 14 as shown.

Figure 3:
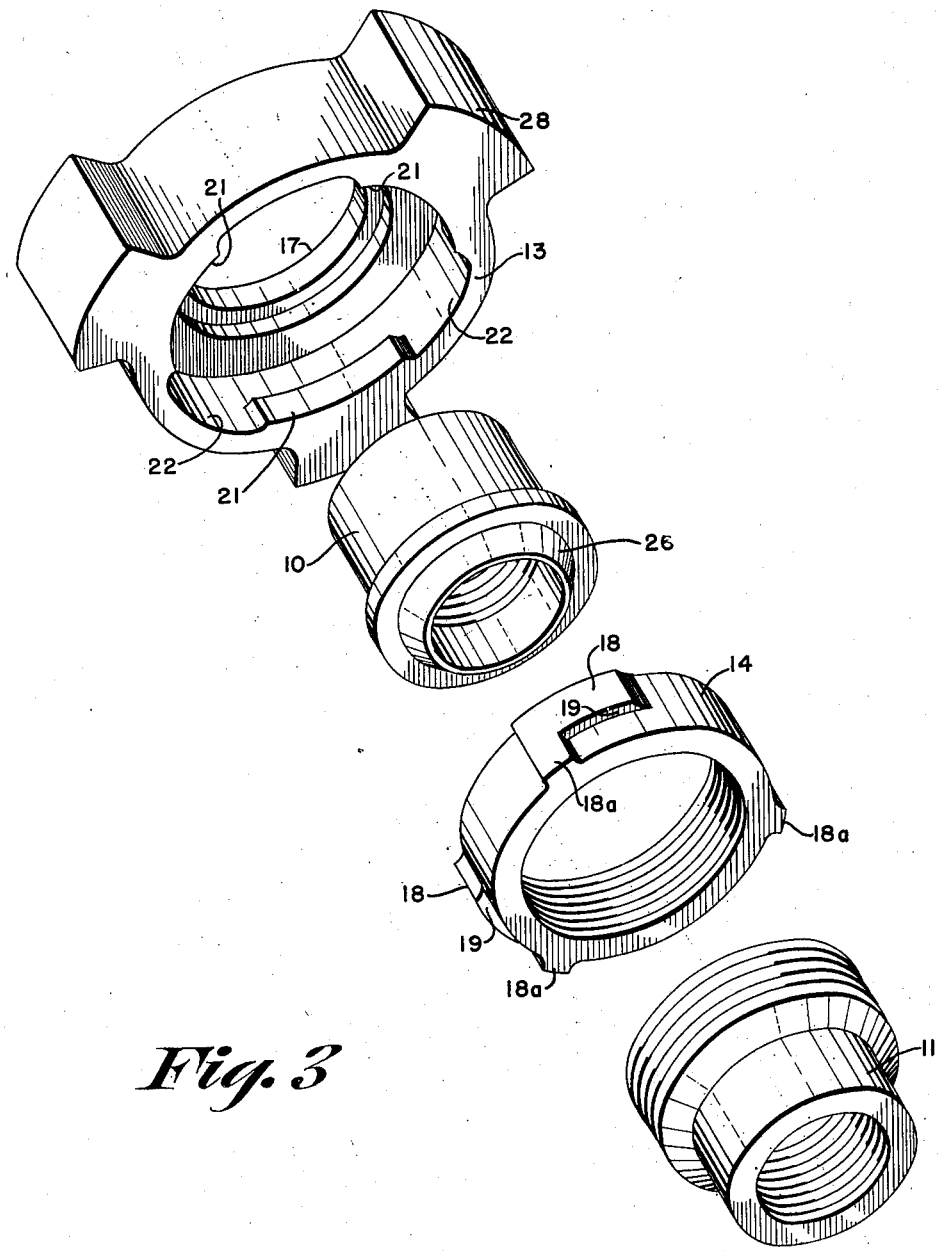
Figure 3 is an exploded view in perspective of the elements of the coupling device.

As better shown in Figure 3, the adapter 14 is provided with external circumferentially spaced lugs 18 having plane surfaces 19 which are arranged at right angles to the axis of the adapter 14 and the coupling device as a whole for reasons which will be readily apparent as the description proceeds.

Figure 2:
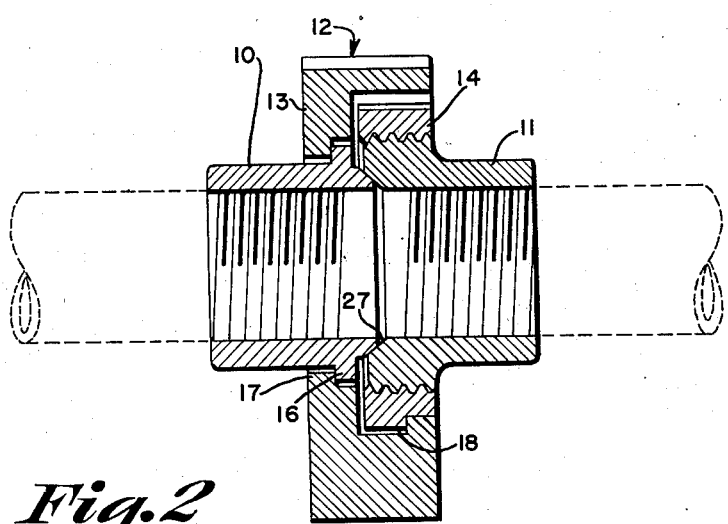
Figure 2 is a cross section of Figure 1 on the line 2—2, and looking in the direction of the arrows.

The outer body portion 13 is provided with a plurality of internal circumferentially spaced lugs 21, which in effect constitute segments of an internal flange. As shown in Figures 1 and 2, the body portion 13 and the adapter 14 are adapted to fit together in nested relation and therefore it will be apparent that the lugs 18 on the adapter 14 are of such dimension as to pass through the recesses 22 between the lugs 21 on the body portion 13. Also, as shown in Figure 3, the axial distance between the inner surface of the flange or collar 17 and the inner surface of the lugs 21 of the body portion 13 is sufficient to accommodate the flange 16 of the nipple 10 and the lugs 18 of the adapter 14 when the coupling ring and the nipples are in assembled relation.

The inner surfaces of the lugs 21 are at right angles to the axis of the coupling ring. When the coupling device is assembled the lugs 18 of the adapter 14 pass through the recesses 22. By rotating the adapter 14 clockwise with respect to the body portion 13 in the position shown in Figure 3, the lugs 18 will circumferentially overlap and form an interlocked coupling with the lugs 21 of the body portion 13. The blocks 18a on the adapter 14 limit the relative rotation between the adapter 14 and the outer body portion 13.

As pointed out above, the inner surfaces of the lugs 21 on the body portion 13 and the surfaces 19 of the lugs 18 on the adapter 14 are at right angles to the axis of the coupling ring and therefore no camming action results from relative rotation between the body portion 13 and the adapter 14. This is an important feature since it relieves the coupling means of any camming action, reduces the tendency of vibration or jarring to cause uncoupling and facilitates coupling and uncoupling when desired.

The nipple 10 is provided with a smooth fluid-sealing surface 26 which is adapted to engage a complementary fluid-sealing surface 27 of the nipple 11. These two surfaces may be flat, conical or spherical and are drawn together and held in fluid-sealing engagement by the coupling ring described.

The operation of the coupling device will now be described. Assuming that the nipples 10 and 11 are attached to any suitable conduits or pipes to be connected together, the external surface 26 of the male portion of the nipple 10 is brought into engagement with the internal surface 27 of the nipple 11. The lugs of the adapter 14 will pass through the recesses 22 between the lugs 21 of the body portion 13 and by rotating the body portion 13 relative to the adapter 14 in a counterclockwise direction (as viewed in Figure 3), the lugs 18 of the adapter 14 and the lugs 21 of the body portion 13 will be brought into circumferentially overlapping interlocking engagement. The relative rotation between the body portion 13 and the adapter 14 is limited by the engagement of the blocks 18a with the ends of the lugs 21. Then by continuing to rotate the body portion 13 in the same direction, the adapter 14 will be rotated with it and the adapter 14 will be advanced on the screws on the nipple 11 to force the surfaces 26 and 27 on the nipples 10 and 11, respectively, into fluid-tight engagement. When it is desired to disconnect the two nipples 10, 11, the body portion 13 is turned in the opposite or clockwise direction (as viewed in Figure 3), so that the interlocking lugs 21 on the body portion 13 are disengaged from the lugs 18 of the adapter 14, permitting the two parts of the coupling ring 12 and the nipples 10, 11 to be separated. Before the two nipples can again be easily coupled together, it will be necessary to rotate the adapter 14 relative to the nipple 11 to unscrew it slightly in order that the adapter may be readily inserted in the body portion 13 far enough for the lugs 18 to be engaged behind the lugs 21. Then, when the body portion 13 is again rotated the adapter 14 will be screwed back in the opposite direction on the nipple 11 to draw the nipples 10, 11 together.

It will be noted from the above description that the arrangement of the two-part coupling ring 12 provides a device in which the screw-threads draw together the two elements 10, 11, to be coupled, and the interlocking lugs 18 and 21 provide an arrangement for very quickly detaching the two parts. As shown in the drawings, the main body portion 13 is provided with hammer lugs 28 which may be tapped by a hammer or a wrench to cause rotation thereof. It will be obvious that the outer surface of the body portion 13 may be provided with any desired surfaces which may be engaged by a wrench for turning the coupling ring 12.

For purposes of illustration the invention has been described as a coupling device for the ends of a pipe or conduit, but it will be readily apparent to those skilled in the art that one of the pipes could be a closure device, such as those usable with filling connection for a fuel tank. It is intended that the terms "hose," "conduit" or "pipe" as used herein, be not interpreted in a limited sense. For example, one of the nipples could be a closure member to be locked against the other nipple which might constitute a filling connection for a container, such as a fuel tank. The closure member could be quickly removed by merely rotating the coupling ring to unlock the circumferentially overlapping lugs of the two parts of the coupling ring.

Although the invention has been described in considerable detail it will be apparent to those skilled in the art that many variations are possible without departing from the inventive concept. It is therefore desired that the invention shall not be limited except in so far as is made necessary by the prior art and by the appended claims.

What I claim is:

1. A coupling device of the type described comprising a plurality of nipples adapted to be attached to the ends of pipes to be coupled together, one of said nipples having an annular outwardly extending flange and a sealing surface disposed inwardly of said flange and the other of said nipples having external screw threads, a female coupling member having a radially inwardly extending flange adapted to rotatably engage said outwardly extending flange, said female member also having a plurality of radially inwardly extending circumferentially spaced lugs, the inner surface of said lugs being arranged at right angles to the axis of said member and spaced axially from said inwardly extending flange, a male coupling member having internal threads adapted to engage the external threads on the other of said nipples and an annular end sealing surface complemental to the sealing surface of said other nipple, said male coupling member also having outwardly extending lugs so spaced circumferentially as to permit their entry between the lugs on said female coupling member to permit said male member to be assembled in nested relation with said female member whereby upon relative rotational movement between said coupling members the lugs on the respective members will be moved into overlapped engagement, and means on said male coupling member adapted to engage the ends of the lugs on said female member to limit relative movement between said coupling members whereby continued movement of said female coupling member will rotate said male coupling member and cause said elements to be drawn together in fluid-tight engagement.

2. As a new item of manufacture, a coupling device of the type described for coupling together two nipples which are adapted to be attached to the ends of pipes which are to be coupled together, comprising an outer coupling member and an inner coupling member, said outer coupling member having an inwardly extending flange on one side thereof adapted to engage an outwardly extending flange on the other of said members, said inner coupling member having internal threads adapted to threadingly engage threads on the other of said members, said outer coupling member having a plurality of circumferentially spaced inwardly extending lugs, the inner surface of said lugs being in a plane normal to the axis of said coupling member and spaced from said inwardly extending flange, said inner coupling member having a plurality of complementary outwardly extending lugs adapted to enter the space between the lugs on said outer coupling member whereby upon relative rotational movement between said coupling members the lugs on the respective members will be moved into interlocked engagement, said inner coupling member being provided with stop means to limit the relative rotational movement between said inner and outer coupling members whereby said nipples and pipes may be quickly coupled in fluid-tight engagement by causing said inner coupling member to be assembled in nested relation in said outer coupling member and by rotating said outer coupling member to cause interlocking engagement between the lugs on the inner and outer coupling members and by further rotation to tighten said inner coupling member on the nipple on which it is screw-threadedly engaged.

NELSON A. JONES.

REFERENCES CITED

The following references are of record in the file of this patent:

UNITED STATES PATENTS

| Number | Name | Date |
|---|---|---|
| 1,442,371 | Tulloch | Jan. 16, 1923 |

FOREIGN PATENTS

| Number | Country | Date |
|---|---|---|
| 507,518 | Great Britain | June 16, 1939 |